United States Patent [19]

Kotani et al.

[11] Patent Number: 5,070,352
[45] Date of Patent: Dec. 3, 1991

[54] RANGE FINDING DEVICE FOR CAMERAS

[75] Inventors: Takaaki Kotani; Seiji Takada, both of Tokyo, Japan

[73] Assignee: Fuji Photo Film Co., Ltd., Kanagawa, Japan

[21] Appl. No.: 182,724

[22] Filed: Apr. 18, 1988

[30] Foreign Application Priority Data

| Apr. 17, 1987 | [JP] | Japan | 62-94932 |
| Apr. 17, 1987 | [JP] | Japan | 62-94933 |
| Apr. 17, 1987 | [JP] | Japan | 62-94934 |

[51] Int. Cl.$^5$ .................... G03B 3/00; G03B 13/18
[52] U.S. Cl. .................... 354/402; 354/412; 354/413; 354/127.1
[58] Field of Search ............ 354/402, 403, 404, 405, 354/406, 407, 408, 409, 127.1, 413, 419, 137, 412

[56] References Cited

U.S. PATENT DOCUMENTS

| 4,336,987 | 6/1982 | Shenk ........................ 354/409 |
| 4,812,872 | 3/1989 | Desormeaux ............... 354/419 |
| 4,827,303 | 5/1989 | Tsuboi ........................ 354/409 |

Primary Examiner—W. B. Perkey
Assistant Examiner—Cassandra C. Spyrou
Attorney, Agent, or Firm—Young & Thompson

[57] ABSTRACT

A range finding device used on an automatic focusing camera comprises a plurality of light receiving photoelectric elements for receiving light reflected from subjects at different distances in the field each of which provides a subject distance signal. A subject brightness detecting device provides brightness information as to the subject, and a distance information providing device provides distance information based on the distance signals. A data table carries data as to a plurality of lens positions predetermined according to combinations of various subject distances and subject brightness. Based on combinations of information as to the subject brightness and subject distance, any of a plurality of lens positions is selected. To the selected lens position the taking lens of the camera is adjusted so as to include the subject within the depth of field of the taking lens.

4 Claims, 6 Drawing Sheets

| BIT PATTERN | | | | | EV NUMBER | | | | | | | | |
|---|---|---|---|---|---|---|---|---|---|---|---|---|---|
| A1 | A2 | A3 | A4 | A5 | 18 | 17 | 16 | 15 | 14 | 13 | 12,11 | 10~8 | 8>EV |
| O | | | | | N5 | N4 | N3 | N3 | N2 | N2 | N1 | N1 | N2 (f 12.1) |
| O | O | | | | N5 | N4 | N3 | N3 | N2 | N2 | N2 (f 12.1) | N2 (f 12.1) | N2 (f 12.1) |
| | O | | | | N6 | N6 | N5 | N5 | N4 | N4 | N3 | N3 | N4 (f 7.8) |
| | O | O | | | N6 | N6 | N5 | N5 | N4 | N4 | N4 (f 7.5) | N4 (f 9.8) | N4 (f 9.0) |
| | | O | | | N6 | N7 | N7 | N7 | N6 | N6 | N5 | N5 | N6 (f 8.0) |
| | | O | O | | N6 | N7 | N7 | N7 | N6 | N6 | N6 (f 8.0) | N6 (f 8.0) | N6 (f 6.5) |
| | | | O | | N6 | N7 | N8 | N8 | N8 | N7 | N7 | N7 | N7 (f 5.3) |
| | | | O | O | N6 | N7 | N8 | N8 | N8 | N7 | N7 | N7 (f 5.3) | N7 (f 4.2) |
| | | | | O | N6 | N7 | N8 | N8 | N8 | N8 | N9 | N9 | N9 (f 2.9) |
| | | | | | N6 | N7 | N8 | N9 | N9 | N9 | N10 | N10 | N10 (f 2.9) |

RANGE FINDING DEVICE FOR CAMERAS

BACKGROUND OF THE INVENTION

The present invention relates to a range finding device used in photographic cameras or video cameras.

Most recent photographic cameras, in particular compact cameras of the type having a lens shutter, are equipped with automatic focusing devices. Such an automatic focusing device generally comprises a photoelectric range finding device and a lens positioning mechanism. The photoelectric range finding device detects the reflected light from a subject in the field to provide a subject distance signal according to the distance of the subject. Responsive to the subject distance signal, the lens positioning mechanism moves the taking lens to a lens position in which the taking lens is suitably focused on the subject.

One such range finding device which is well known is an active type range finding device in which a line of light is projected onto a subject and reflected from the subject. A photoelectric light sensor receives the reflected light from the subject to provide a subject distance signal corresponding to the distance of the subject. The range finding device using such a line of light has no need to be exactly aimed at the subject during range finding. In this regard, the range finding device using a line of light is advantageous in comparison with the type using a spot of light which has to be exactly aimed at the subject to be photographed. Furthermore, the range finding device using a line of light can prevent the range finding device from merely detecting a space between two subjects standing side by side. For these reasons, it is desirable to provide such an active type range finding device using a line of light on simplified compact cameras.

Meanwhile, as long as the range finding device provides only one subject distance signal, the taking lens can be correctly adjusted to a corresponding lens position without confusion. However, because there are often various subjects such as a principal subject, secondary subjects and a background in the field of view, the range finding device may provide more than one subject distance signal. Consequently, it becomes hard to correctly adjust the taking lens to a position in which the taking lens is focused on the principal subject.

In an attempt at overcoming this problem, there has been proposed an improved automatic focusing device in which the taking lens is adjusted so as to give priority to the subject at the shortest distance when more than one subject distance signal is provided. This is the so-called short distance priority system.

There is also, as is disclosed in Japanese Patent Unexam. Publs. Nos. 59-146,028 and 59-146,029, another short distance priority system in which the taking lens is adjusted so as to give priority to the subject at the shortest distance of all the possible subjects, but only in consideration of the field depth thereof. According to this short distance priority system, when there are plural subjects in the field, the taking lens is focused on the subject at the shortest subject distance within a suitable subject distance range as defined by the field depth thereof and nearer to the shorter extremity of the range of field depth.

One problem with the short-distance-priority systems of range finding devices is that, when taking a picture of an intended principal subject that is disposed behind a short-distant secondary subject, the principal subject will be out of focus. In the system taught by the above-mentioned publications, when plural subject distance signals are provided, the shortest subject distance signal is used to shift the suitable subject distance range in which a subject is fairly brought into focus, toward a longer subject distance. Therefore, if the shortest subject distance signal is of the principal subject, what is fairly brought into focus is subjects or a scene other than the principal subject, and so the principal subject will be out of focus.

Another problem with the short distance priority system of range finding devices is that, because the larger the aperture of the taking lens becomes as the brightness of subject becomes less, the narrower will be the depth of field of the taking lens. The suitable subject distance range in which subjects are brought into sharp focus is narrowed when plural subject distance signals are provided. For these reasons, the probability that the principal subject will be out of focus becomes greater.

OBJECTS OF THE INVENTION

It is, therefore, an object of the present invention to provide a range finding device in which the taking lens can be adjusted to a lens position wherein it has a suitable subject distance range within which the principal subject is disposed with a high probability even when plural subject distance signals are provided.

It is another object of the present invention to provide a range finding device by which the taking lens can be adjusted to a lens position wherein it has a suitable subject distance range within which the principal subject is disposed with a high probability even when a subject distance signal is provided only for a secondary subject.

SUMMARY OF THE INVENTION

The above objects of the present invention can be achieved by providing a range finding device comprising distance detecting means having a plurality of photoelectric light receiving elements for detecting different subject distances of a plurality of subjects in the field, means for providing subject distance information based on one or more than one subject distance signals from the subject distance detecting means, means for providing information as to subject brightness, and a data table carrying data on lens positions corresponding to various combinations of subject distance and subject brightness to which the taking lens is adjusted. The range finding device selects one of the lens positions with reference to the data table when the subject distance information is provided. When plural subject distance signals are provided, the subject distance information providing means provides subject distance information based on at least two subject distance signals for two subjects at different distances shorter than the others.

According to a feature of a preferred embodiment of the present invention, the range finding device further comprises means for providing a flash actuating signal when the detected brightness of the subject is below a predetermined level and plural subject distance signals are actually provided. If in fact the flash actuating signal is provided, an electronic flash is triggered in synchronism with a programmed shutter of the camera according to subject brightnesses lower than the predetermined level.

According to a feature of a further preferred embodiment of the present invention, the range finding device further comprises means carrying data as to suitable distance ranges corresponding to the depth of field of the taking lens at various aperture sizes and means for shifting the selected lens position toward a particular subject distance range within which are disposed most of principal subjects to be photographed.

BRIEF DESCRIPTION OF THE DRAWINGS

Still other aspects of the invention and more specific features will become apparent to those skilled in the art from the following description of preferred embodiments considered together with the accompanying drawings, in which.

DETAILED DESCRIPTION OF THE INVENTION

Range finding devices according to preferred embodiments of the present invention can be incorporated in 35mm still picture cameras. Because such cameras are well known, this description will be directed in particular to elements forming part of or cooperating directly with apparatus embodying the present invention. It is to be understood, however that camera elements not specifically shown or described may take various forms known to those skilled in the art.

Figure 1:
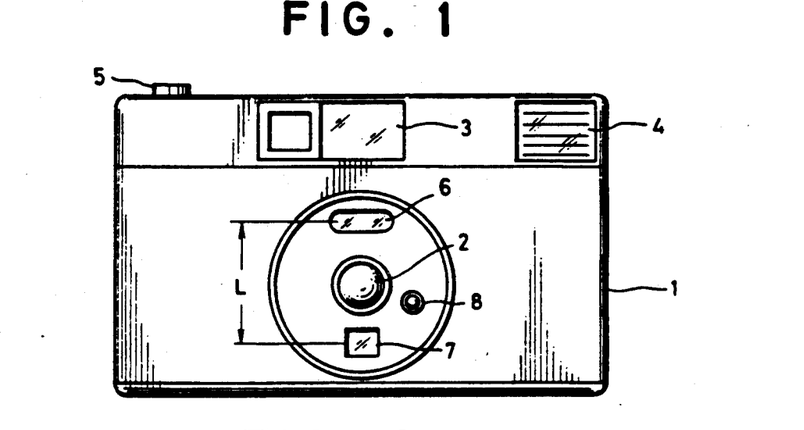
FIG. 1 is a front view of an automatic focusing camera with a built-in electric flash embodying the present invention.

Referring now to FIG. 1, shown therein is an automatic focusing camera embodying the present invention. As shown, the camera body 1 is provided with a taking lens 2 at substantially the center of the front wall of the camera body 1, a viewfinder window 3 and a light emitting window 4 for a built-in electronic flash 33, both of the windows 3 and 4 being formed in an upper section thereof, and a shutter release member 5 at the top thereof. Above the taking lens 2 there is means 6 for projecting a line of light in the forward direction. On the opposite side of the taking lens 2 from the light projecting means 6 there is light receiving means 7 for detecting light reflected from a subject in the field, the light receiving means 7 being spaced from the light projecting means 6 by a distance L equal to the predetermined base length of the range finding device. By these means 6 and 7 the automatic range finding device is formed which is described in detail in association with FIG. 2. In FIG. 1, besides the taking lens 2, a light measuring element 8 is provided for detecting the brightness of the subject. As is well known in the art, based on the output from the light measuring element 8, an actual f-number or the maximum opening size of a programmable shutter 32 is automatically determined which will be suitable for making a proper exposure.

Figure 2:
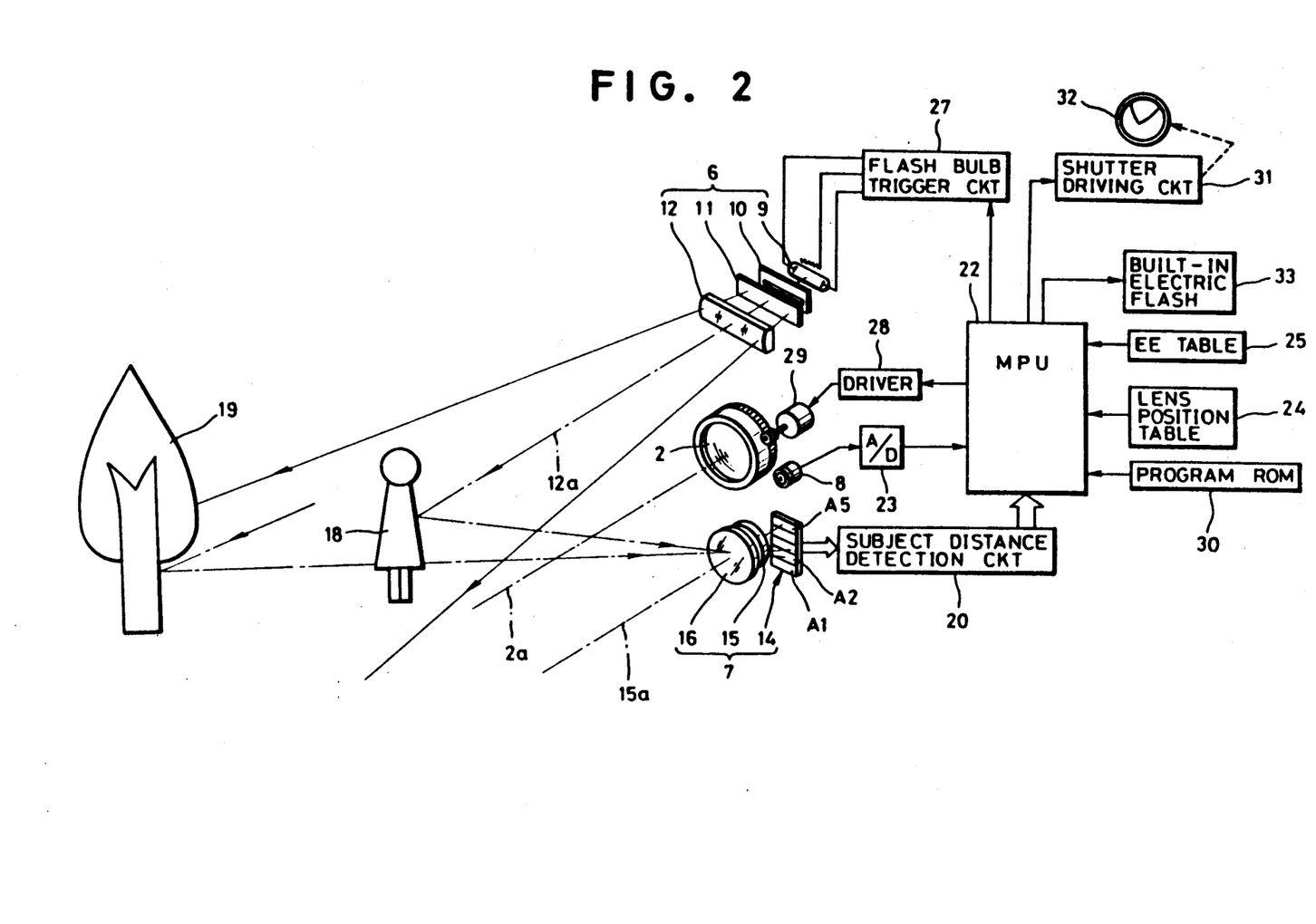
FIG. 2 is a schematic illustration showing the construction of a range finding device of the present invention.

Referring now to FIG. 2, the light projection means 6 comprises a flash bulb 9 for emitting light, a plate 10 having an elongated transverse narrow slit formed therein, a color filter 11 for passing near-infrared light therethrough and a cylindrical lens 12 for projecting and directing the line of near-infrared light in the forward direction to illuminate the subject or subjects in the field. The cylindrical lens 12 is so disposed within the camera body 1 as to have its optical axis 12a parallel to the optical axis 2a of the taking lens 2. The light projection means 6 thus constructed projects a horizontally extending line of near-infrared light in the forward direction.

On the other hand, the light receiving means 7 comprises a light sensor 14 for detecting near-infrared light, a lens 15 for focusing the near-infrared light reflected from the subject on the sensor 14, and a filter 16 for cutting out visible light. The lens 15 is disposed within the camera body 1 with its optical axis 15a parallel to the optical axis 12a of the cylindrical lens 12, and hence the optical axis 2a of the taking lens 2. The light sensor 14 disposed in the focal plane of the lens 15 comprises a plurality, for example five in this embodiment, of photoelectric light receiving elements A1 through A5 arranged in a vertical line which is parallel to the direction of the base distance L of the range finding device of the camera. The photoelectric light receiving elements A1 through A5 receive light reflected from subjects at different distances. For example, light reflected from a principal subject 18 at a distance shown in FIG. 2 is received by the photoelectric light receiving element A1 and light reflected from a secondary subject 19 behind the principal subject 18 or at a distance greater than that of the principal subject 18 is received by the photosensitive light receiving element A2.

Output from the light sensor 14 is read by a subject distance detection circuit 20 which converts outputs from the photoelectric light receiving elements A1 through A5 into subject distance information comprising five distance signals in the form of a bit pattern (which is hereinafter referred to as a bit pattern subject distance signal). For example, when the photoelectric light receiving elements A1 and A2 receive light and provide outputs therefrom, the distance detection circuit 20 provides a bit pattern subject distance signal "11000" which in turn is sent to a microprocessor unit (which is hereinafter abbreviated as MPU) 22. To the MPU 22 a brightness signal as brightness information is also sent from the light measuring element 8 through an A/D converter 23.

Connected to the MPU 22 are a lens position table 24 comprising a ROM, an EE table 25 and a program ROM 30. The MPU 22 retrieves lens position data from the lens position table 24 according to the combination of the bit pattern subject distance signal and the brightness signal received thereby.

Figure 3:
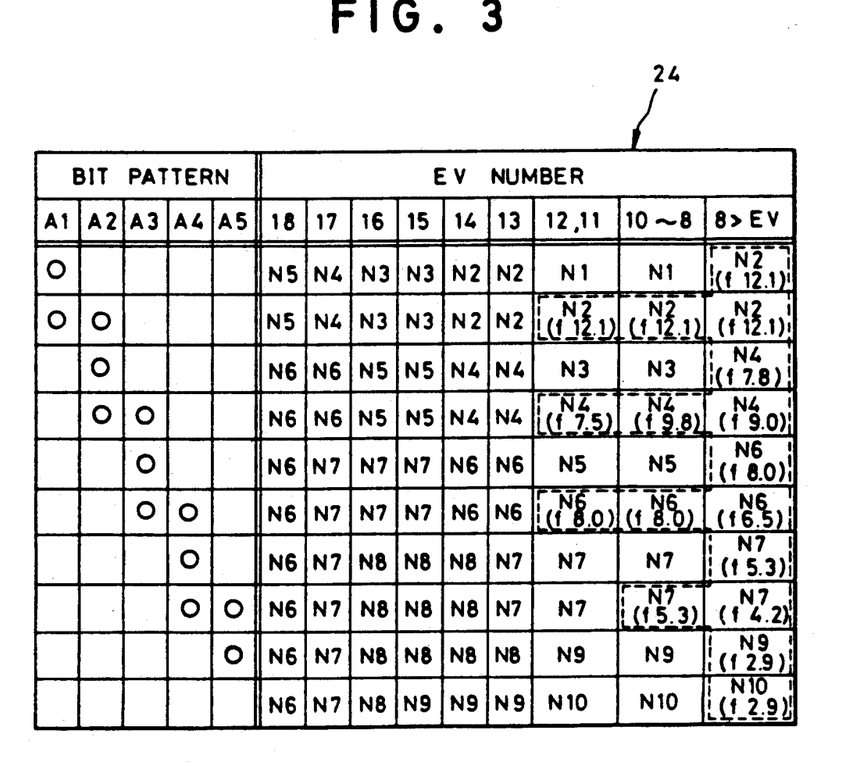
FIG. 3 shows a lens position data table.

As is shown in FIG. 3, the lens position table 24 carries data on a plurality of lens positions to which the taking lens 2 can be selectively adjusted stepwise, for example ten lens positions $N_1$ through $N_{10}$ in this embodiment, corresponding to the predetermined combinations of various bit pattern subject distance signals and subject brightness information in EV numbers. If only one photosensitive element, for example the photosensitive element A1, receives a part of the reflected light from a subject and the subject distance detection circuit 20 provides a bit pattern distance signal "10000", the MPU 22 retrieves the data of the lens position $N_5$ from the lens position table 24 for a subject which has a brightness giving an EV number of "18"; of the lens position $N_3$ for a subject having a brightness giving an EV number of "15"; or of the lens position $N_1$ for a subject having a brightness giving an EV number of "12" or "11", for instance. By referring to the lens position table 24, even though a plurality of photoelectric light receiving elements A receive light, a suitable lens position can be selected on the basis of distribution patterns of photoelectric light receiving elements actually receiving incident light (which is called in this specification a bit pattern). When lens positions $N_a$ (a=1 to 10) enclosed in a chained line depicted in FIG. 3 are selected, the built-in electric flash 33 is automatically activated to allow a flash exposure.

Figure 4:
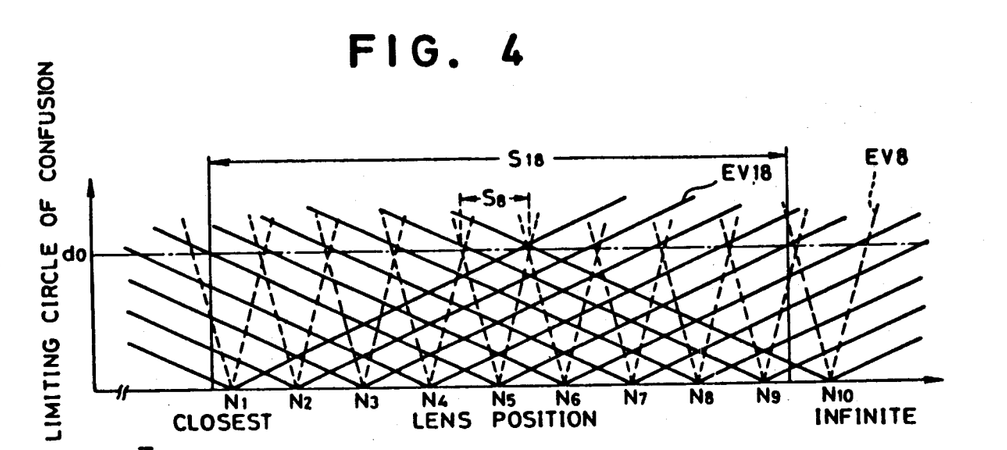
FIGS. 4 and 5 are diagrams showing the depth of field of a taking lens for various lens positions.

Referring now to FIG. 4, shown therein is the depth of field of the taking lens in association with the lens positions and subject distances in logarithms. As is well known to those skilled in the art, the critical or maximum field of depth is defined by a limiting circle-of-confusion which is indicated by a diameter $d_0$. Therefore, the critical or maximum field of depth of the taking lens 2 is defined between intersections of chained or solid lines and a dotted line drawn for the limiting circle-of-confusion for each lens position N. As will be understood from FIG. 4, the taking lens 2 can be adjustable to the predetermined lens positions $N_1$ to $N_{10}$ between a shortest and an infinite subject distance. At each lens position $N_a$, the taking lens 2 can be fairly focused on a subject disposed within a distance range defined by the critical depth of field. In this sense, the distance range which is defined by the critical depth of field for each lens position is hereinafter referred to as a suitable subject distance range. The depth of field of the taking lens 2 is shown by a chained line for an EV number of "8" and by solid line for an EV number of "18" for each lens position. For example, the depth of field of the taking lens 2 adjusted to the lens position $N_5$ is shown by $S_{18}$ for the EV number of "18", and by $S_8$ for the EV number of "8".

As is well known in the art, when the maximum opening of the program shutter 32 becomes smaller with an increase in the EV number, the suitable subject distance range becomes wider. For example, when the taking lens 2 is adjusted to the lens position $N_5$ for a subject having a brightness giving an EV number of "18", the suitable subject distance range is enlarged to the range $S_{18}$ which includes almost all finite subject distances between its extremities as shown in FIG. 4. On the other hand, when the subject has a brightness giving an Ev number of "8", since the maximum opening of the program shutter 32 increases, the suitable subject distance range becomes narrower as is shown by a dotted line in FIG. 4. For example, when the taking lens 2 is adjusted to the lens position $N_5$ for a subject having a brightness giving an EV number of "8", the suitable subject distance range is narrowed as indicated by "$S_8$". As will be apparent from the above examples, the suitable subject distance range of the taking lens 2 becomes wider depending on the increment of the EV number.

In the operation of the above-described automatic focusing camera equipped with a range finding device according to the present invention, when depressing the shutter button 5 after framing a subject to be photographed in the viewfinder, the MPU 22 provides a flash bulb trigger circuit 27 with a trigger signal to energize the flash bulb 9 of the light projection means 6 of the range finding device so as to illuminate subjects in the field with a line of light through the slit in the plate 10, the color filter 11 and the cylindrical lens 12. When this line of light illuminates both the principal and the secondary subjects 18 and 19 at different distances as is shown in FIG. 2, the reflected light from these subjects 18 and 19 is received by plural photoelectric light receiving elements, for example the photoelectric light receiving elements A1 and A2, of the light sensor 14. Consequently, the subject distance detection circuit 20 in connection with the light sensor 14 provides a bit pattern subject distance signal, "11000", which in turn is sent to the MPU 22. Simultaneously with this, a subject brightness signal is detected by the light measuring element 8 and sent as brightness information to the MPU 22 through the A/D converter 23. If the subject has a brightness giving an EV number of, for example, "18", the MPU 22 selects the lens position $N_5$ with reference to the lens position data table 24. Thereafter, the MPU 22 actuates the motor 29 such as a servo motor through a driver 28, thereby moving the taking lens 2 in the forward direction to adjust it to the lens position $N_5$. For positive adjusting, there may be provided a potentiometer for detecting and feeding back a moved position either of the taking lens 2 or of the stepping motor 29 to the MPU 22 to control the driver 28. At the completion of adjustment of the taking lens 2 to the selected lens position $N_5$, the MPU 22 actuates a shutter driving circuit 31 to open the program shutter 32 to an aperture size needed to make an exposure of "18". In this exposure, since the taking lens 2 adjusted to the lens position $N_5$ has a depth of field defining a suitable subject distance range extending between the shortest subject distance and an almost infinite subject distance, the taking lens 2 can be focused on both the principal and the secondary subjects 18 and 19.

Meanwhile, if the subject 18 and/or 19 has a low brightness, the program shutter 32 is controlled to open to a large opening size in order to make a proper exposure, thereby narrowing the range of the depth of field of the taking lens 2. In this case, if the taking lens 2 is adjusted to the lens position $P_5$ corresponding to the bit pattern subject distance signal "11000", one of the subjects at a shorter distance leaves the suitable subject distance range defined by the depth of field of the taking lens 2. Therefore, there are several lens positions $N_a$, for example the lens position $N_5$ to $N_1$, for the bit pattern subject distance signal "11000". For example, if a subject has a brightness giving an EV number of "14", the lens position $N_2$ is selected. At the lens position $N_2$, the taking lens 2 can be focused on any of the subjects which are at distance within a suitable subject distance defined by the critical depth of field thereof shown in FIG. 4.

As will be apparent from the lens position table 24 shown in FIG. 3, the reflected light can be received by one or more photoelectric elements A. Therefore, although different bit pattern subject distance signals include the same bit signal representative of a shorter subject distance, the taking lens 2 can be adjusted to different lens positions according to the different bit pattern subject distance signals common thereto. For example when a subject has a brightness giving an EV number of "10", the taking lens 2 is adjusted to the lens position $N_3$ when the bit pattern subject distance signal is "01000" and to the lens position $N_4$ when the bit pattern subject distance signal is "01100" (the shorter subject distance is represented by the second bit signal "1"). When the light sensor 14 detects two subjects, it is assumed that one of the two subjects is the principal subject. For this reason, it is advantageous to widen the suitable subject distance range or the depth of field of the taking lens 2 adjusted to a lens position selected on the basis of the bit pattern subject distance signal, in order to focus the taking lens on the two subjects at different distances.

To widen the suitable subject distance range of the taking lens 2, a flash exposure is made in order to use the program shutter 32 with a small aperture size or f-number when the light sensor 14 detects two subjects. For this purpose, there are memorized in the data table 24 data on aperture sizes or f-numbers at which the built-in electronic flash 33 is synchronized with the program shutter 32 to be conjointly actuated.

Enclosed by a chained line in the lens position table 24 shown in FIG. 3 is a flash exposure area in which lens positions and f-numbers of the program shutter 32 are correspondingly related. For each such combination of a lens position $N_a$ and an f-number, a flash exposure is provided. The f-numbers of the program shutter 32 are determined based on the guide number of the built-in electronic flash 33 and subject distances corresponding to the lens positions $N_a$. Therefore, when the MPU 22 reads the lens position data included within the flash exposure area of the lens position table 24, the camera is automatically shifted to a flash exposure mode. As a result, the built-in electronic flash 33 is triggered to illuminate the subject when the program shutter 32 opens to an f-number determined according to the lens position to which the taking lens 12 is adjusted.

Figure 5:
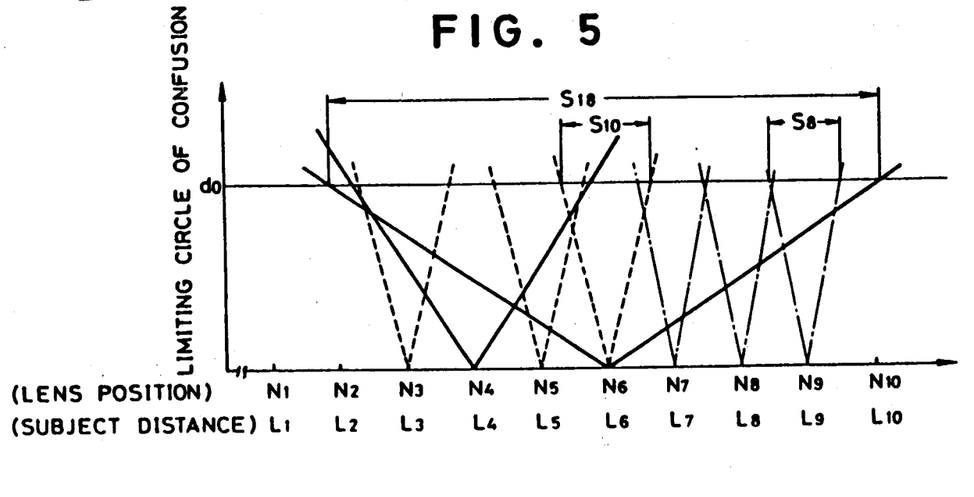

As is shown in FIG. 3, the suitable subject distance ranges of the taking lens 2 for the lens positions $N_1$ to $N_{10}$ can cover all subject distances from the shortest to infinity. In FIG. 5, the depth of field S is shown by $S_8$ for a subject having a brightness giving an EV number of "8" which is the smallest EV number at which an ordinarily controlled automatic exposure (EE exposure) is allowed, by $S_{10}$ for a subject having a brightness giving an EV number of "10" and by $S_{18}$ for a subject having a brightness giving an EV number of "18". The data on the relationship between f-numbers and lens positions for effecting a flash exposure may be memorized in the EE table 25 as well as subject brightness information.

Figure 6:
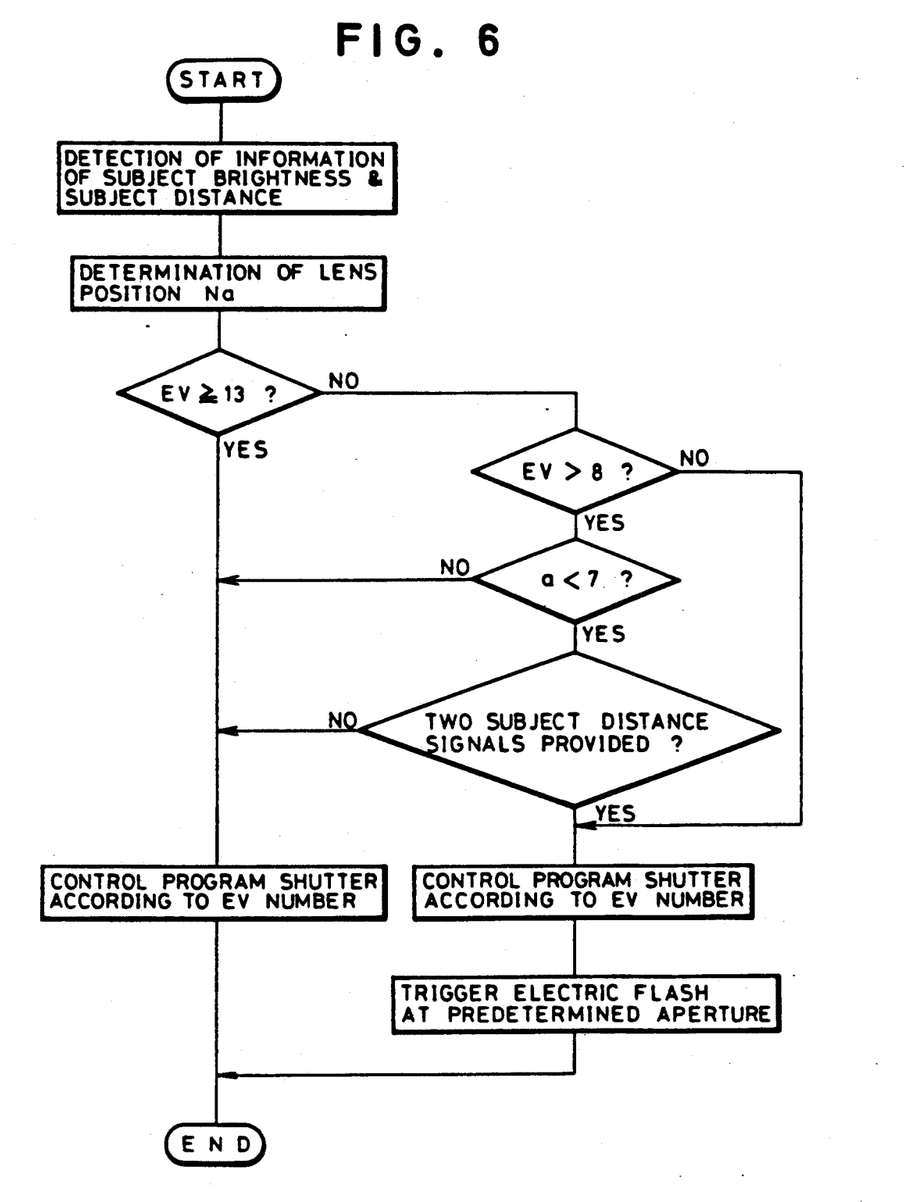
FIG. 6 is a flow chart showing the sequential operation of a range finding device according to a preferred embodiment of the present invention in which a flash exposure is made.

Referring now to FIG. 6, which is a flow chart illustrating a flash exposure routine for the MPU 22, the first step is to read the brightness of the subject and the distance of the subject and then to determine a lens position $N_a$ based on the data read. Following the determination of lens position $N_a$, a first question is asked: "Is the EV number equal to or larger than 13?" If the answer to the first question is yes, the program shutter 32 is controlled according to the EV number to make an ordinary exposure. If the answer to the first question is no, a second question is asked: "Is the EV number larger than eight (8)?" If the answer to the second question is no, the program shutter 32 is controlled according to the EV number and, when the program shutter 32 opens to an f-number corresponding to the determined lens position $N_a$, the built-in electronic flash 33 is triggered to make a flashmatic exposure.

If the answer to the second question is no, a third question is asked: "Is the determined lens position $N_a$ nearer than the lens position $N_7$?" If the answer to the third question is no, the program shutter 32 is controlled according to the EV number to make an exposure. If the answer to the third question is yes, a fourth question is asked: "Are there two subject distance signals provided?" If the answer to the fourth question is no, the program shutter 32 is controlled according to the EV number to make an exposure. On the other hand, if the answer to the fourth question is yes, the program shutter 32 is controlled according to the EV number and, when the program shutter opens to an f-number corresponding to the determined lens position $N_a$, the electronic flash 33 is triggered to make a flashmatic exposure.

According to the above-described flashmatic exposure control, because a flashmatic exposure is effected the program shutter 32 with an f-number smaller than the maximum f-number of the program shutter 32 in the ordinarily controlled automatic exposure (EE exposure) for a subject of which the brightness gives an EV number smaller than "10", the depth of field of the taking lens 2 adjusted to the lens position $N_4$ covers the field depth not only in the lens position $N_3$ but also in the position $N_4$ for the brightness of a subject having an EV number of "10".

As will be apparent from the flow chart shown in FIG. 6, when the determined lens position $N_a$ is farther from the lens position $N_6$, indicating that the subject distance is too great to benefit from the flash, or when the subject has a brightness giving an EV number equal to or greater than EV "13", or when only one subject distance signal is provided from any one of the photoelectric elements $A_1$ through $A_5$, the MPU 22 provides no signal for actuating the electronic flash 33. On the other hand, when the subject has a brightness giving an EV number less than EV "8" which is out of the automatically controllable exposure range, a flash exposure is introduced regardless of subject distance.

When the subject has a brightness giving the EV number of "10" and the bit pattern subject distance signal is "00011", the taking lens 2 is adjusted not to the intermediate lens position $N_8$ between the lens position $N_7$ for the bit pattern subject distance signal "00010" and the lens position $N_9$ for the bit pattern subject distance signal "00001", but rather to the closer lens position $N_7$. This lens adjustment is based on the fact that when two subject distances are included in the bit pattern subject distance signal, the suitable focusing range can be made wider by adjusting the taking lens 2 in consideration not of the far subject distance signal but rather of the closer subject distance signal. If the taking lens 2 is adjusted to be focused on a subject at a subject distance greater than the subject distance $L_7$, no flash light reaches the subject. Therefore, no actuation signal is provided for the built-in electronic flash 33.

When the subject has a brightness within the brightness range necessary to effect the ordinarily controlled automatic exposure and any two adjacent light receiving photoelectronic elements receive light from the subject, the electronic flash 33 and the taking lens 2 are set to the following conditions:

| Subject Distance L | $L < L_7$ | $L \geq L_7$ |
| --- | --- | --- |
| EV number > 8 | Electric Flash OFF | Electric Flash OFF |
|  | Intermediate Lens | Intermediate Lens |

-continued

| Subject Distance L | L < L₇ | L ≥ L₇ |
|---|---|---|
| EV number ≦ 8 | Position Electric Flash ON Intermediate Lens Position | Position Electric Flash OFF Closer Lens Position |

As is shown in the above table, when the subject has a brightness which is within the automatically controllable brightness range but near the low end thereof, the electronic flash 33 is available to enable using the program shutter 32 with a substantially reduced opening size. Therefore, even if there are two subjects in the field and two distance signals from any two adjacent photoelectric elements of the photoelectric elements A1 through A5, the two subjects are certain to be within the depth of field of the taking lens 2. Consequently, the taking lens 2 can sharply focus either one of the two subjects which could be the principal subject. It is to be noted that a flash exposure can be effected when three consecutive photoelectric elements receive light as well as two adjacent photoelectric elements, by increasing the data as to lens positions in the lens position table 24.

Figure 7:
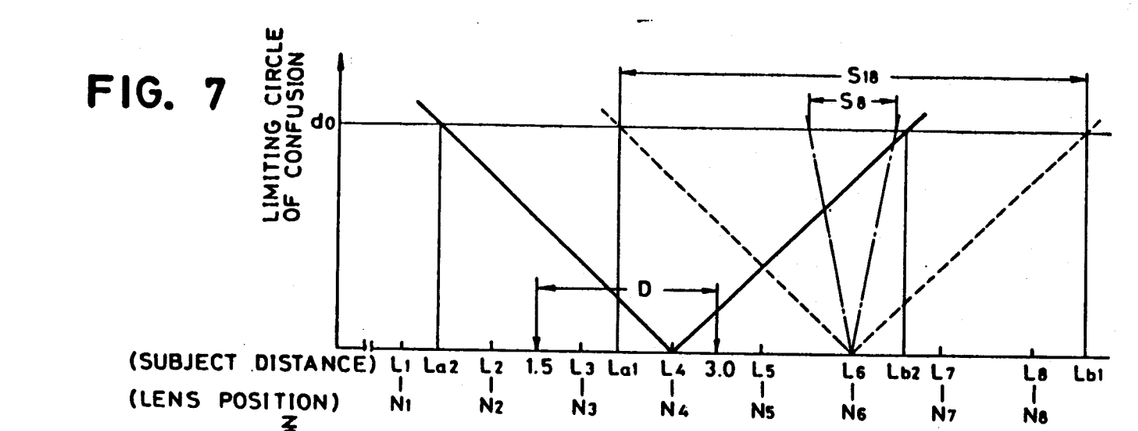
FIG. 7 is a diagram showing the shifting of the taking lens position for an EV number of "18"
Figure 8:
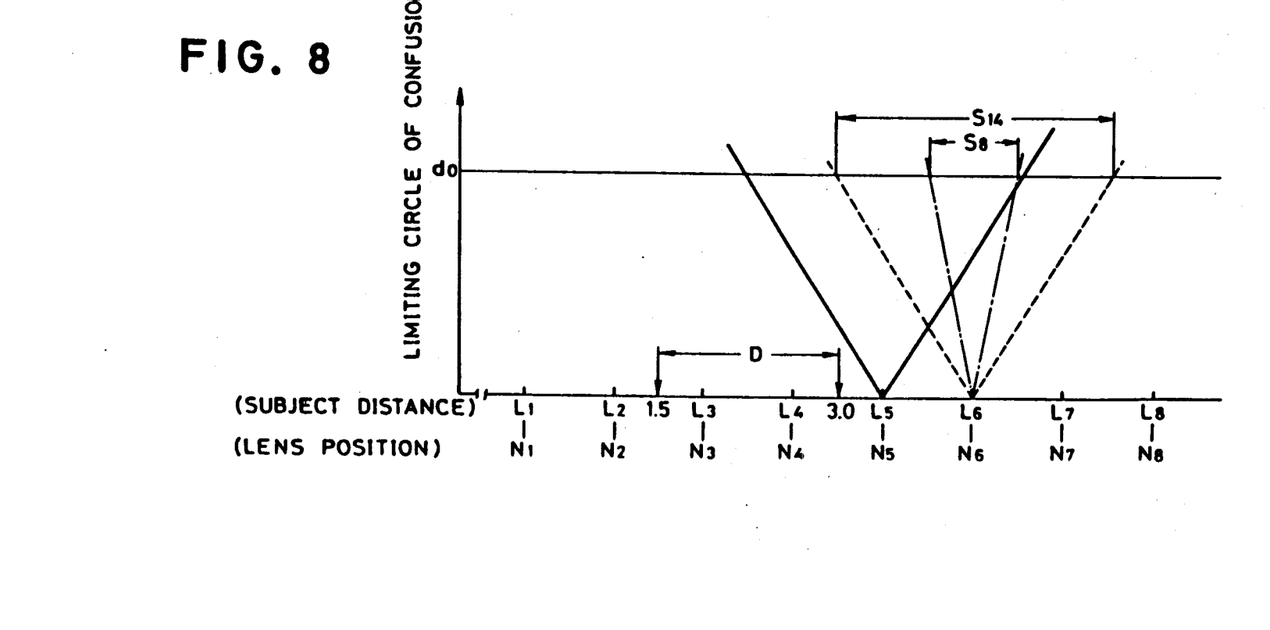
FIG. 8 is a diagram similar to FIG. 7 but for an EV number of "14"
Figure 9:
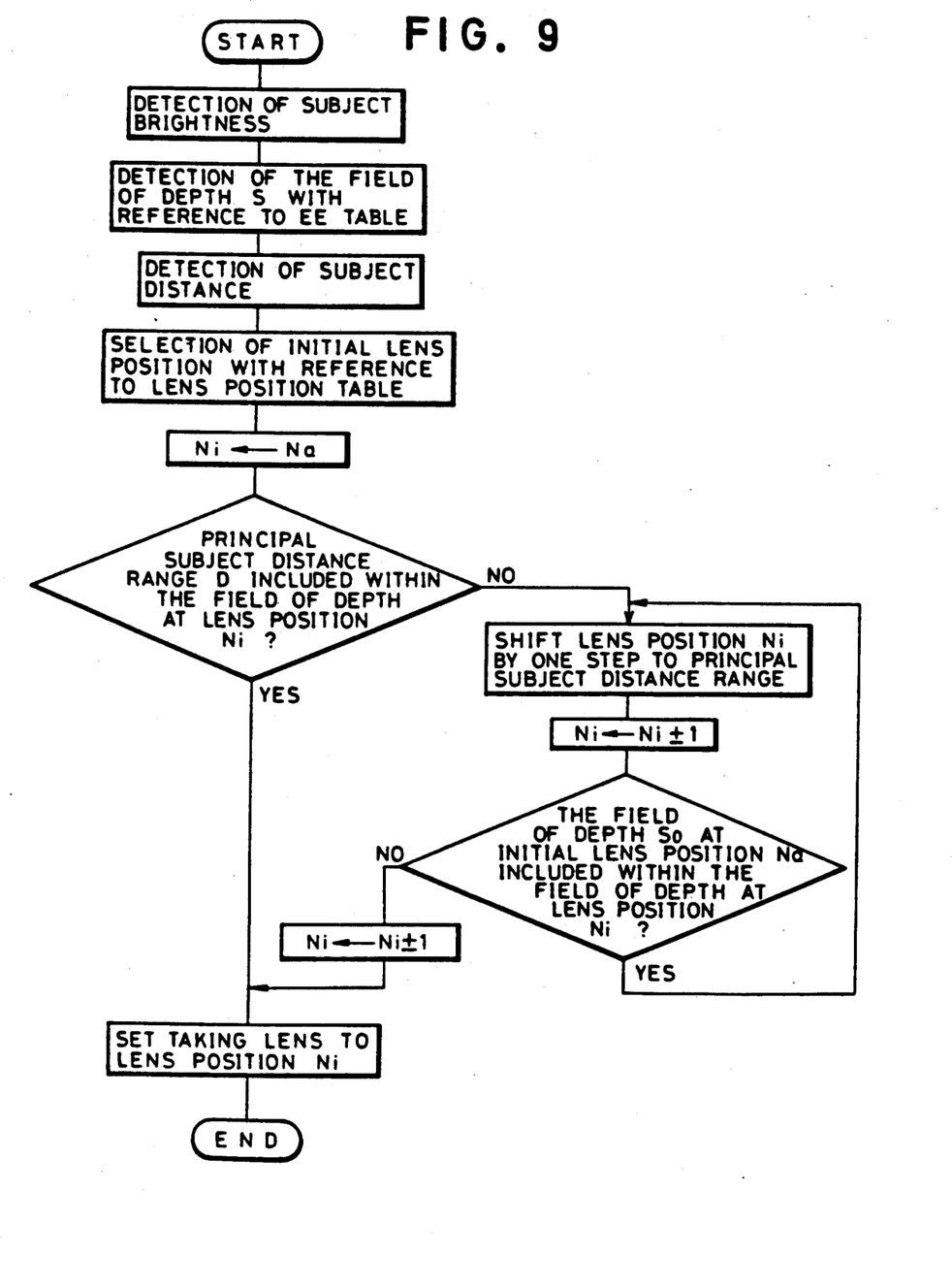
FIG. 9 is a flow chart showing the sequential operation of a range finding device according to another preferred embodiment of the present invention in which the shifting of the taking lens position is effected.

FIGS. 7 to 9 show another embodiment of the present invention. In this embodiment, the EE table 25 carries data on the depth of field of the taking lens 2 corresponding to each combination of subject brightness and controlled opening of the program shutter 32 for the subject brightness. The distance range D from 1.5 to 3.0m shown in FIGS. 7 and 8 means a subject distance range within which principal subjects to be photographed are located with a high probability. This subject distance range D (which is hereinafter referred to as the principal subject distance range) has been experimentarily determined on the basis of the subject distance distribution of principal subjects obtained from an analysis of a large number of actual photographs. An example of such a subject distance distribution is shown on the following table:

| Subject Distance (m) | ~0.9 | 0.9 ~ 1.2 | 1.2 ~ 1.5 | 1.5 ~ 3.0 | 3.0~ |
|---|---|---|---|---|---|
| % | 2.5 | 7.5 | 13.0 | 61.2 | 15.8 |

Reference is now had to FIG. 9 which is a flow chart of the main routine for the MPU 22 used in this embodiment. The first step in FIG. 9 is to detect the brightness of, for example, the subject 18 shown in FIG. 2, and, based on the detected subject brightness, to read the field of depth of the taking lens 2 for the corresponding EV number from the EE table 25. For example, when the subject 18 has a brightness giving the EV number of "18", the depth of field of $S_{18}$ is read from the EE table 25. Following the detection of the subject brightness, the subject distance of the subject 18 is detected. When, for example, the photoelectric light receiving element A2 receives light from the subject 18, the light sensor 14 provides a bit pattern subject distance signal "01000". Based on the subject distance signal "01000" and the subject brightness "EV 18", the lens position $N_a$ to which the taking lens 2 is initially adjusted is read from the lens position table 24.

The depth of field $S_{18}$ of the taking lens 2 initially adjusted to the lens position $N_6$ has its least and greatest subject distances at $L_{a1}$ and $L_{b1}$, respectively. As will be apparent from FIG. 7, the depth of field $S_{18}$ on its shorter subject distance side partially covers the principal subject distance range D. However, in consideration of the bit pattern of the subject distance signal, the depth of field $S_{18}$ on its longer subject distance side covers subject distances at which very few principal subjects are located in actual practice.

In such a case, the MPU 22 shifts the lens position $N_a$ of the taking lens 2 from the lens position $N_6$ toward the principal subject distance range D stepwise. For this, a first question is asked: "Is the principal subject distance range D included within the depth of field S for the lens position $N_i$?" If the answer to the first question is yes, the MPU 22 causes the driver 28 to turn the motor 29 so as to actually adjust the taking lens to the lens position $N_i$. If the answer to the first question is no, the lens position $N_a$ is shifted toward the shorter end of the range by one step.

This shifting of the lens position is repeated until the farther extremity of the depth of field "$S_{18}$" enters the depth of field "$S_8$". For this repetition of shifting of the lens position $N_a$, a third question is asked. When the lens position $N_a$ is shifted to the lens position $N_3$ to place the farther extremity of the depth of field $S_{18}$ within the depth of field "$S_8$", the MPU 22 shifts back the lens position by one step to a final lens position, namely the lens position $N_4$ in this example, as is shown in FIG. 7. As a result, the depth of field of the taking lens 2 comes to have its shorter and longer subject distances at distances $L_{a2}$ and $L_{b2}$, respectively, and therefore, covers not only the principal subject distance range D completely but also the depth of field $S_8$ of the taking lens 2 at its initial lens position $N_6$.

After the determination of the final lens position, the MPU 22 causes the driver 28 to turn the motor 29 so as to actually adjust the taking lens 2 to the final lens position $N_4$ and provides a lens adjustment completion signal so as to unlock a locking mechanism (not shown), allowing the shutter button 5 to be depressed. When the shutter button 5 is fully depressed, the MPU 22 causes the shutter driving circuit 31 to drive the program shutter 32 to open to the opening size corresponding to the detected subject brightness and to close, thereby to complete an exposure.

As will be apparent from the lens position table 24, when the bit pattern subject distance signal is "00100" and the subject has a brightness giving the EV number of "14", an initial lens position $N_6$ is also selected. In this case, the depth of field $S_{14}$ of the taking lens 2 for the lens position $N_6$, as is shown in FIG. 8, cannot cover almost the whole of the principal subject distance range D. Therefore, the MPU 22 shifts the lens position $N_a$ toward the principal subject distance range D step by step. If the lens position $N_a$ is shifted to the lens position $N_4$, the depth of field $S_{14}$ cannot cover the depth of field $S_8$ of the taking lens 2 for the initial lens position $N_6$. In such a case, the lens position $N_5$ is selected as the final lens position. On the other hand, when the subject has a brightness giving the EV number of "8", the initial lens position $N_6$ is selected as the final lens position.

Although the present invention has been described as to active-type range finding devices using a line of light, the present invention may be applied to active-type range finding devices using a spot of light, and others.

It will, of course, be understood that various changes and modifications may be made without departing from the scope of the present invention, which generally stated, consists in the matter set forth in the accompanying claims.

What is claimed is:

1. A range finding device for use on an automatic focusing camera having a flash and a plurality of light receiving elements for receiving light reflected from subjects at different distances in the field, respectively, each light receiving element providing a distance signal representative of a different subject distance, said device comprising:
   detecting means for detecting the brightness of a said subject to provide brightness information as to said subject;
   distance information providing means for providing, when a plurality of said distance signals are provided, said subject distance information based on at least two distance signals of subject distances;
   lens position determining means for determining a lens position according to said brightness information and subject distance information; and
   signal providing means for providing a signal for actuating said flash only when said at least two distance signals are provided and said brightness is lower than a predetermined level.

2. A device as defined in claim 1, wherein said lens position determining means has a data table carrying data as to a plurality of lens positions to which a taking lens of said camera is selectively adjusted according to combinations of said subject distance information and said brightness information.

3. A range finding device for use on an automatic focusing camera having a plurality of light receiving elements for receiving light reflected from subjects at different distances in the field, respectively, each light receiving element providing a distance signal representative of a different subject distance according to which one of a plurality of lens positions is selected for adjusting a taking lens, said device comprising:
   initial lens position detecting means for detecting one of a plurality of lens positions according to said distance signal, to any one of said plurality of lens positions a taking lens of said camera is adapted to be selectively adjusted;
   means for detecting the depth of field of said taking lens at said initial lens position according to subject brightness; and
   means for shifting said initial lens position toward a final subject distance range that includes a shortest distance of from 1.5 to 3 m. when a subject distance range defined by said depth of field includes said final subject distance range.

4. A device as defined in claim 3, wherein said final lens position to which said lens is shifted from said initial position is a lens position at which said taking lens has a depth of field defining a subject distance range including a subject distance range defined by the depth of field of said taking lens at said initial position.

* * * * *